(12) United States Patent
Balciunas et al.

(10) Patent No.: US 11,977,864 B2
(45) Date of Patent: May 7, 2024

(54) AUTOMATED DATA EXTRACTOR CODE GENERATION AND IMPLEMENTATION

(71) Applicant: Argyle Systems Inc., New York, NY (US)

(72) Inventors: Povilas Balciunas, Vilnius (LT); Kenni Petersen Jørgensen, Lisbon (PT)

(73) Assignee: ARGYLE SYSTEMS INC., New York, NY (US)

( * ) Notice: Subject to any disclaimer, the term of this patent is extended or adjusted under 35 U.S.C. 154(b) by 149 days.

(21) Appl. No.: 17/717,507

(22) Filed: Apr. 11, 2022

(65) Prior Publication Data

US 2023/0195432 A1    Jun. 22, 2023

Related U.S. Application Data

(60) Provisional application No. 63/292,662, filed on Dec. 22, 2021.

(51) Int. Cl.
*G06F 8/30* (2018.01)
*G06F 9/54* (2006.01)

(52) U.S. Cl.
CPC ................ *G06F 8/37* (2013.01); *G06F 9/547* (2013.01)

(58) Field of Classification Search
CPC .................................. G06F 8/37; G06F 9/547
See application file for complete search history.

(56) References Cited

U.S. PATENT DOCUMENTS

| | | | |
|---|---|---|---|
| 10,924,514 B1* | 2/2021 | Altman | G06N 7/01 |
| 2002/0042821 A1* | 4/2002 | Muret | H04L 41/22 709/238 |
| 2008/0232363 A1* | 9/2008 | Wang | H04L 63/0428 370/389 |
| 2010/0250497 A1* | 9/2010 | Redlich | G06F 11/2094 707/661 |
| 2011/0213742 A1* | 9/2011 | Lemmond | G06F 16/3344 706/13 |
| 2014/0201838 A1* | 7/2014 | Varsanyi | G06F 21/552 726/23 |
| 2017/0223032 A1* | 8/2017 | El-Moussa | H04L 63/1416 |
| 2018/0285740 A1* | 10/2018 | Smyth | G06N 3/084 |

* cited by examiner

*Primary Examiner* — Wei Y Zhen
*Assistant Examiner* — Brahim Bourzik
(74) *Attorney, Agent, or Firm* — Lowenstein Sandler LLP (57) ABSTRACT

A method includes obtaining, by a processing device, web traffic including a set of messages associated with a target platform, analyzing, by the processing device, the web traffic to obtain a set of data extractor code candidates for extracting a set of data from the target platform, and selecting, by the processing device, data extractor code from the set of data extractor code candidates.

18 Claims, 6 Drawing Sheets

AUTOMATED DATA EXTRACTOR CODE GENERATION AND IMPLEMENTATION

RELATED APPLICATION

This application claims the benefit of U.S. Provisional Application No. 63/292,662, filed Dec. 22, 2021, the entire contents of which are hereby incorporated by reference herein.

TECHNICAL FIELD

The disclosure is generally related to data extraction (e.g., web data extraction), and more particularly, to automated data extractor code generation and implementation.

BACKGROUND

In computing, a compiler is a program that translates computer code written in a source programming language into computer code written in a target programming language. For example, the source programming language can be a higher-level, human-readable language from which source code can be written, and the target programming language can be a lower-level, machine-readable language from which code executable by a machine can be written ("machine-readable code"). Accordingly, a compiler can convert human-readable source code into machine-readable code to create an executable program.

SUMMARY

In one implementation, disclosed is a method. The method includes obtaining, by a processing device, web traffic including a set of messages associated with a target platform, analyzing, by the processing device, the web traffic to obtain a set of data extractor code candidates for extracting a set of data from the target platform, and selecting, by the processing device, data extractor code from the set of data extractor code candidates.

In another implementation, disclosed is a system. The system includes a memory device, and a processing device, operatively coupled to the memory device, to perform operations including obtaining web traffic including a set of messages associated with a target platform, analyzing the web traffic to obtain a set of data extractor code candidates for extracting a set of data from the target platform, and selecting data extractor code from the set of data extractor code candidates.

In yet another implementation, disclosed is a non-transitory machine-readable storage medium. The non-transitory computer-readable storage medium stores instructions that, when executed by a processing device, cause the processing device to perform operations including obtaining web traffic including a set of messages associated with a target platform, analyzing the web traffic to obtain a set of data extractor code candidates for extracting a set of data from the target platform, and selecting data extractor code from the set of data extractor code candidates.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein are systems and methods to implement automated data extractor code generation. Data extractors, also referred to as data scrapers or data scanners, are technology platforms that can utilize a set of application programming interfaces (APIs) to enable secure data extraction or scraping from one or more target platforms (e.g., websites and/or web applications) for sharing with a computer application ("application"). For example, the data can include web data. More specifically, a data extractor can be a program that, when given a request including user credentials of a user affiliated with a target platform, can authenticate to the target platform, and extract specific information about the user from the target platform in accordance with the request. For example, a user can select the target platform from a list of target platforms displayed by an application, and provide user credentials to authorize the request. The user credentials can include login information (e.g., a username and password combination) that provides access to an account of the user maintained by the target platform ("target platform account"). To provide additional security, the user credentials can further include multi-factor authentication credentials to enable multi-factor authentication. The data extractor can establish a communication link ("link") between the application and the target platform. The data extractor can then request a set of data from the target platform, extract the set of data from the target platform, and provide the application with the set of data. The data extractor can implement end-to-end encryption to securely and privately provide the set of data to the application.

A data extractor can be implemented within a data aggregator that aggregates or compiles data from a number of different target platforms. For example, a user can utilize a graphical user interface (GUI) of the data aggregator to create a data aggregator account with the data aggregator, link a number of target platform accounts to the data aggregator, and retrieve a set of data from a database maintained by each target platform account. The data aggregator can display each set of data in a particular format for viewing by the user on a display device. Upon obtaining user consent, the data aggregator can share at least one set of data with at least one external service. However, there are a large number of potential target platforms across the world. The process of implementing software that can extract data from all potential target platforms is time consuming, error prone, and can require a lot of maintenance.

Aspects of the disclosure address the above and other deficiencies by providing technology that implements automated data extractor code generation. A computing system can include a data aggregator having a data extractor, and a data extractor code generator. For example, the data extractor can receive a request for a set of data, and the data extractor can execute the request to extract the set of data from a target entity in communication with the data aggregator. For example, the set of data can include a set of web data. The data extractor can provide its own domain-specific language (DSL). Instead of programming the data extractor, a user of the data extractor can declare the resources needed to extract data, and the data extractor executes the DSL.

The data extractor code generator can implement a process to automatically generate code (e.g., source code) that is compatible with the data extractor. As will be described in further detail herein, the data extractor code generator can obtain web traffic corresponding to a target platform, analyze the web traffic to obtain information pertaining to a data extractor specification, generate a set of data extractor code candidates from the information, and select data extractor code from the set of data extractor code candidates. The data extractor code generated by the data extractor code generator is in a proper format for retrieving a set of data from the target platform. Therefore, the data extractor can extract the set of data from the target platform using the data extractor code. The set of data can include data pertaining to a user account maintained by the target platform, and the set of data can be extracted in response to receiving authentication from the user to retrieve the set of data from the target platform. The process can be repeated for any number of target platforms. The data aggregator can perform one or more actions with the set of data. For example, the data aggregator can display the set of data to the user. As another example, the data aggregator can share the set of data with one or more external services with user consent.

Therefore, the systems and methods described herein include technology that enhances utilization of computing resources, such as processor usage and memory usage, for a computer system. In particular, aspects of the disclosure provide technology that enhances the efficiency and/or performance of a computing system by reducing processor and memory usage. By automatically generating code in a proper format for data retrieval from a target platform, embodiments described herein can improve the success of data extraction and reduce the number of data extraction errors. Various aspects of the above referenced methods and systems are described in details herein below by way of examples, rather than by way of limitation.

Figure 1:
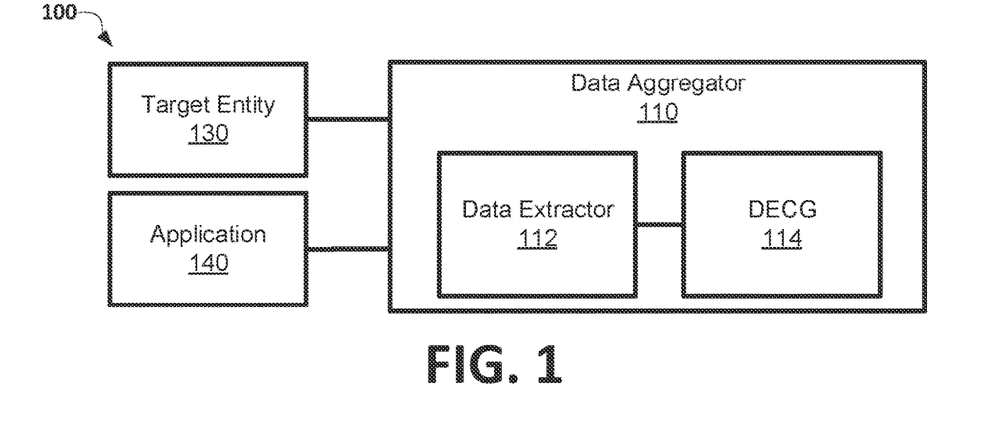
FIG. 1 depicts a block diagram of an example computer system, in accordance with some embodiments.

FIG. 1 is a diagram of one embodiment of an example computer system ("system") 100, in accordance with some embodiments. As shown, the system 100 includes a data aggregator 110 having a data extractor 112 and a data extractor code generator (DECG) 114, at least one application 130 in communication with the data aggregator, and at least one target entity 140 in communication with the data aggregator 110. Although the DECG 114 is shown as being included a sub-component of the data aggregator 110 in this illustrative example, the DECG 114 can alternatively be a separate component from the data aggregator 110 (e.g., provided by an external service in communication with the data aggregator 110).

The target entity 140 can be at least one of a website, a web application, etc. The target entity 130 can maintain a number of user accounts each created and managed by a respective user, where each user account maintains data for the respective user. Access to a user account of the target entity 130 can be granted by receiving valid user credentials for the user. For example, the user credentials can include login information (e.g., a username and password combination) set by the user. The user credentials can further include one or more multi-factor authentication credentials. The one or more multi-factor authentication credentials can include at least one of a one-time passcode (OTP) sent to the user for enabling two-factor authentication (e.g., via textual message to a mobile device linked to the user account, via electronic mail to an electronic mail address linked to the user account), a passcode supplied by a passcode generator application, linked to the user account, that refreshes the passcode after a certain amount of time, etc.

The data extractor 112 can, on behalf of the application 130, establish a communication link ("link") between the application 130 and the target platform 130. For example, a user that is affiliated with the target platform 130 can select the target platform 130 from a list of target platforms displayed by the data aggregator 110, and request a set of data from the target platform 130. For example, the set of data can include a set of web data. The set of data can include data pertaining to a user account maintained by the target platform 130, and the set of data can be extracted in response to receiving authentication from the user to retrieve the set of data from the target platform. For example, requesting the set of data can include providing user credentials to authorize the request. The user credentials can include the login information (e.g., a username and password combination) that provides access to the account of the user maintained by the target platform 130 ("target platform account"). To provide additional security, the user credentials can further include multi-factor authentication credentials to enable multi-factor authentication. If the request is successful, the data extractor 112 can extract the set of data from the target platform 130, which can be maintained on the data aggregator 110. The data aggregator 110 can perform one or more actions with the set of data. For example, the data aggregator 110 can display the set of data to the user. As another example, the data aggregator can share the set of data with the at least one application 140 with user consent. The data extractor 112 can implement end-to-end encryption to securely and privately provide the set of data to the at least one application 140.

For example, the data extractor 112 can receive a request for a set of data, and the data extractor 112 can execute the request to extract the set of data from the at least one target entity 130. The request can include user credentials that are used to authenticate to a target platform to extract specific information about the user from the target platform in accordance with the request. The data extractor 112 can provide its own domain-specific language (DSL). Instead of programming the data extractor, a user of the data extractor 112 can declare the resources needed to extract data, and the data extractor 112 can execute the DSL. For example, the building blocks of the data extractor 112 can include a request declaration, a request builder declaration, a response checker declaration, a request flow declaration, and a web flow declaration.

Web applications are built around requesting resources from a computing device (e.g., server) and receiving a response. For example, the data extractor 112 can send a request (e.g., HTTP/HTTP2/QUIC request) to the target platform 140, which can return a response to the data extractor 112 (e.g., HTML/JSON/Binary/PDF).

A request declaration can include a number of fields that define features of the request. A request declaration can include a first set of fields that define how to make a request (e.g., URL, method, headers). For example, as will be described in further detail below, the request declaration can be used to build a request based on data accessible during runtime of the data extractor 112. A request declaration can further include a second set of fields that define how to handle the response. For example, the second set of fields can define how to validate expectations (e.g., "Request.check_resp"), retry errors (e.g., "Request.retries"), upload a response body to storage (e.g., "Request.upload_document"), pass the response body to a data transformer (e.g., "Request.tag"), etc. An example request declaration written in the Python® programming language is provided as follows:

from [data extractor] import Request
    class IpReq(Request):
      url="https://httpbin.org/ip"
      method="GET"

This declaration declares a "GET" HTTP request with the URL "https://httpbin.org/ip", which can be executed by the data extractor 112, with a human-readable name "IpReq". "GET" refers to a GET method that is used to retrieve whatever information is identified by the URI (in this example, the URI is the URL "https://httpbin.org/ip"). The data extractor 112 can execute this declaration at any suitable (e.g., specified) time.

A request builder declaration can be used to build a request declaration based on data accessible during runtime of the data extractor 112. This can be an authorization token from an account configuration, some identifier (ID) from a previous request, a current date, etc. For example, the request builder declaration can declare input information for building an HTTP request. One type of request builder declaration is an activities request builder declaration, which is used to build an activities request ("ActivitiesReq"). An example activities request builder declaration written in the Python® programming language is provided as follows:

class ActivitiesReq(Request):
      url="<https://api.platform.com/activities/{date}>"
      method="GET"
      builder=(
        RequestBuilder( )
        .add_headers(lambda req, state, prev_res: {"Authorization": "Token {state.cfq.auth_token}"})
        .url(lambda req, state, date: req.url.format (date=date))
        .data( . . . )
      )

In this example, the input information includes a date, and the request builder can add an "Authorization" header with information received during running same for the date part within the request URL. The request builder declaration is not executed immediately, but rather when a request declaration is being built. The "lambda" function of each request builder method can include three arguments: (1) the request declaration instance that is being built ("req"); (2) a task state instance to obtain task specific information such as an account instance ("state"); and (3) a previous result ("prev_res"), which is any data that is the result of a previous flow step of the request flow declaration.

The request builder declaration can receive input information from a request flow declaration that declares a sequence of steps to be executed to build the request (e.g., activities request). An example request flow declaration written in the Python® programming language to provide input data that gets passed to a request builder is provided below:

RequestFlow ( )
      .then("2021-01-02")
      .req (ActivitesReq)

In this example, the request flow declaration "RequestFlow" declares a set of steps to be executed. A first step is to declare the date Jan. 2, 2021, and a second step is to build the activities request "ActivitiesReq" based at least in part on the date Jan. 2, 2021.

A response checker declaration can be used to perform response validation with respect to a declaration response. An illustrative example of a response checker written in the Python® programming language is provided as follows:

Class UserData(Request):
      method="GET"
      url="https://api.platform.com/driver_app/v2/profile"
      check_resp=[
        expect response( ).case(status_code(200)),
        error.match(InvalidatedSession).case(status_code (401)),
      ]

In this example, an HTTP response with the status code 200 is expected. An HTTP response with the status code 401 will be treated as an error and be denoted an "InvalidatedSession." When the data extractor 112 executes this request, it can inspect the response and raise an error if it does not match the expectations of the response. Thus, the response checker declaration can be used to ensure that the data extractor 112 obtains valid data.

A request flow declaration can be used when a request needs to be constructed dynamically and/or chained with other requests. For example, a request flow declaration can be used to define actions to be executed after a response declaration is received. Examples of actions that can be executed after a response is received can include constructing a new request declaration based on the response, logging metadata about the response, ignoring errors, etc. A request flow can include multiple "flow steps" which are executed sequentially. Flow steps can enable a composition of steps in which the result of one step is passed to a next step, and actions (e.g., logging) can be applied at any time in between sequential executions. An example request flow declaration written in the Python® programming language is provided as follows:

```
class ActivitiesListReq(Request):
    url="<https://api.platform.com/activities>"
    method = "GET"
class ActivitiesReq(Request):
    url = "<https://api.platform.com/activities/{date}>"
    method = "GET"
    builder = (
      RequestBuilder( )
      .url(lambda req, state, date: req.url.format (date=date))
    flow = (
      RequestFlow ( )
      req(ActivitiesListReq)
      then(lambda state, resp: resp.json_data["activities"])
      .then(lambda state, activities: [a["start_date"] for a in activities]])
               .req_foreach(ActivitiesReq)
    )
```

In this example, multiple actions are chained together. For example, the request "MyIp" will be built and sent to a server. Then, JSON (JavaScript Object Notation) is parsed from the HTTP response body. The data can then be parsed in a manner in which the output of one flow step is input into the other. Moreover, a request flow declaration can accept an option list of retries. An entire flow can be retried if an error occurs in any of the request flow declaration steps. As an illustrative example written in the Python® programming language:

```
payouts = (
  RequestFlow (
      provides-fields.payouts.all,
      retries=[
            Retry(CannotParsePaystubOptionsException,
new_proxy_required-False)
            .constant(seconds=5, max_retries=5),
      ],
   )
)
```

In this example, the request flow "RequestFlow" does not include steps. This example demonstrates how a request flow can be retried using the "retries" parameter if the flow was to generate an error at runtime. In this example, if "RequestFlow" has an error with the "CannotParsePaystubOptionsException" (i.e., an exception in which paystub options cannot be parsed), then "RequestFlow" can be retried at most 5 times, where each retry is performed every 5 seconds.

A request flow declaration can cause a web browser to mimic user behavior by automating actions in the web browser. For example, a request flow declaration can define retries, ask for sub-flows to be run in the process, etc. An example request flow declaration written in the Python® programming language is provided as follows:
RequestFlow ( )
.go_to(url="https://liteblue.usps.gov/",
    wait_until="networkidle")
.wait_for_selector("input[name='LoginPortletFormID']
    ")
.type_with_keyboard("input
    [name='LoginPortletFormID' ]", "test", delay=400)
.delete_and_fill(
    "input[name='LoginPortletFormID']", lambda s, w_r:
        s.acc.auth_key
)
.click_element("submit")
.sleep(2000)
.evaluate("document.querySelector('div').textContent")
.then(lambda_s,    web_result:    print
    (f"{web_result.raw_result}"))
In this example, when the request flow declaration "RequestFlow" is evaluated, the data extractor 112 will go to the website indicated by the URL "https://liteblue.usps.gov/", wait_until="networkidle". The data extractor 112 will wait for an HTML element "LoginPortletFormID" to be rendered, automatically enter text "test" in the HTML element when rendered, and click on a button element called "submit".

It may not be known ahead of time whether a request declaration will work before being executed by the data extractor 112. To ensure declaration coherence, the data extractor 112 can enable a way to assign a type property to a declaration. The property can require that a certain type of entry be built for a request. Illustratively, a request to extract weekly earnings data can require a date and time entry. In the following illustrative example written in the Python® programming language, a request to extract weekly earning data ("WeeklyEarnings") can require a date and time entry ("DateTime") to be built:

```
class WeeklyEarnings(Request[ScanPeriodTask, DateTime]):
    method = "GET"
    url = "{{week_start}}" delay="150" data-sk="tooltip.parent"
    href= "https://api.platform.com/drivers//
    workweeks/%7B%7Bweek_start%7D%7D"
    inherit; color: inherit; text-decoration-line:
    none;">https://api.platform.com/drivers//workweeks/{{week_start}}"
        builder = Request.url(
            lambda req, _s, week_start: req.url.format(
                week_start-week_start.format("YYYY-MM-DD")
            )
        )
    provides = (
        fields.payouts.employer + fields.payouts.gross_pay +
        fields.payouts.status + ...
    )
scan_earnings = (
    RequestFlow[ScanPeriodTask, None]( )
    .then(
        lambda state, _prev_res: get_mondays_between_scan_range(
            state.scan_task.scan_range
        )
    )
    .req_foreach(WeeklyEarnings)
)
```

Moreover, a static type checker can provide a warning about mismatching exceptions. To illustrate a static type checker, the following example written in the Python® programming language is provided:
RequestFlow( )
    .then("not a date time")
    .then(WeeklyEarnings.build)
In this example, a "WeeklyEarnings" request builder is expecting data of type "DateTime". However, textual data is being provided. With type information in place, this can enable code analysis to be run for debugging. Otherwise, the mismatch data can trigger an error during runtime.

At runtime, the data extractor 112 can receive an input package including a number of modules, identify declarations from the modules, and build a data scanner from the declarations. For example, assume an input package is named "my scanner" that includes modules such as "my_scanner.settings" and "my_scanner.transform". The declarations that the data extractor 112 can identify can include, for example, a settings variable of a settings object that can be located in the "my_scanner.settings" module, a transform function that can be located in the "my_scanner.transform" module (and a transform_pds function that can be located in the "my_scanner.transform" module if pds is supported by the data scanner as indicated by a "Settings.features" field), any request flow variables in any module of the input package, and any request subclasses in any module of the input package. Once the data extractor 112 has identified the declarations, the data extractor 112 can run the data extractor or data scanner to extract the set of data. The data extractor 112 can run the data scanner in a number of ways depending on the underlying runner being used to run the data scanner.

The runner can execute any "top-level" requestable, which is a requestable that can be executed alone (e.g., does not require execution inside of another request flow). Generally, a requestable is a declaration that can be evaluated and executed by the data extractor 112. For example, any requestable that has a properly set "provides" field can be considered a top-level requestable. The "provides" field is what determines which fields a specific requestable provides.

The data extractor 112 can implement field-based scanning, which is how the data extractor 112 can select which requestables to execute. A request can have a "provides" field, which declares more domain-specific information. For example, the provides field of a request can list data fields that can be extracted when the request is executed. If the data extractor 112 receives a request with the provides field "fields.profile.all", then the data extractor 112 can execute any requestable that provides any of the fields.profile fields. An example of a requestable written in the Python® programming language is provided as follows:
    class ProfileReq(Request):
        url="https://example.com/profile"
        provides=fields.profile.birthday
In this example having a provides field "fields.profile.birthday"), the data extractor 112 would execute a profile request declaration ("ProfileReq") to request and extract birthday data from the profile, because fields.profile.birthday is a subset of the fields.profile.all field. Requestables that do not properly set the "provides" field may not be executed by the runner. However, one way to execute such requestables is if a request flow executes the given request or enters another request flow through a subflow (e.g., a request flow called from another flow). Accordingly, the data extractor 122 can discover request declarations and execute the request declarations accordingly, as long as the "provides" field is properly set. Similarly, for request flow declarations, request flow declarations that properly set the "provides" field can be executed by the runner. An illustrative example written in the Python® programming language is provided as follows:
    flow=RequestFlow(provides=fields.profile.birthday)
        .then( . . . )
In this example, "RequestFlow" declares a the provides field "fields.profile.birthday".

The DECG 114 can implement a process to automatically generate code that is compatible with the data extractor 112. For example, the DECG 114 can generate declarations executable by the data extractor 112. The code generated by the DECG 114 is in a proper format that can be used by the data extractor 112 to retrieve a set of data from the target platform 140. To do so, as will be described in further detail herein, DECG 114 can obtain web traffic corresponding to the target platform 140, analyze the web traffic to obtain information pertaining to a data extractor specification, generate a set of data extractor code candidates from the information, and select data extractor code from the set of data extractor code candidates. Therefore, the data extractor 112 can use the data extractor code generated by the DECG 114 to extract the set of data from the target platform 140. The process can be repeated for any number of target platforms. Further details regarding the process to automatically generate code that is compatible with the data extractor 112 will be described below with reference to FIG. 2A.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media.

Figure 2A:
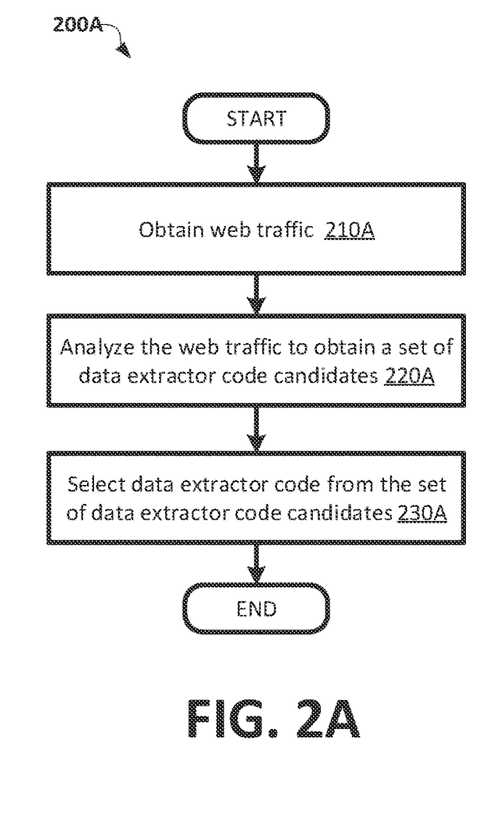
FIG. 2A depicts a flow diagram of an example method for automatically generating data extractor code, in accordance with some embodiments.

FIG. 2A depicts a flow diagram of an example method 200 for automatically generating data extractor code, in accordance with some embodiments. For example, the method 200A may be performed by DECG 114 as shown in FIG. 1. Method 200A may be performed by one or more processing devices that may comprise hardware (e.g., circuitry, dedicated logic, programmable logic, microcode, etc.), executable code (such as is run on a general purpose computer system or a dedicated machine), or a combination of both. For example, the one or more processing devices can perform individual functions, routines, subroutines, or operations to implement the method 200A.

At block 210A, processing logic obtains web traffic. For example, the processing logic can obtain web traffic between a client platform (e.g., client device) and a target platform (e.g., website, web application) from one or more sources related to navigation to a target platform. The one or more sources can include at least one of a web browser, an application, an old scanner, etc. For example, an application can be at least one of a web application, a mobile application, etc.

In some embodiments, obtaining the web traffic includes capturing the web traffic. The processing logic can implement a man-in-the-middle attack to capture the web traffic (e.g., HTTPS man-in-the-middle attack). For example, the processing logic can utilize a web traffic recorder (e.g., a proxy recorder) to capture the web traffic, and generate a web traffic recording. For example, the web traffic recording can be an HTTP cassette for storing HTTP requests.

The web traffic includes a set of messages between the client platform and the target platform. For example, the set of messages can include at least one of a set of requests from the client platform to the target platform, or a set of responses from the target platform to the client platform. In some embodiments, the set of messages includes a set of HTTP messages. Each message can include a number of components (e.g., fields).

For example, examples of components of an HTTP message (e.g., HTTP request or HTTP response) include message header, message body, message length, Uniform Resource Identifier (URI) (e.g., Uniform Resource Locator (URL)), method to be performed on the resource identified by the URI ("method"), timestamp, etc. A message may depend on another message, and messages may have a particular order. As will be described in further detail below, to automate data extraction, the set of messages can be replayed in an identical manner as the target platform. For example, the target platform can be at least one of a web application, a mobile application, or a website.

At block 220A, the processing logic analyzes the web traffic to obtain a set of data extractor code candidates. The set of data extractor code candidates can include one or more data extractor declarations that can be implemented by a data extractor (e.g., the data extractor 112 of FIG. 1) to extract data from a target platform.

Analyzing the web traffic to obtain the set of data extractor code candidates can include generating at least one intermediate representation from the web traffic, and deriving the set of data extractor code candidates from the at least one intermediate representation. For example, an intermediate representation can be a representation of the set of messages that determines how each message of the set of messages relates to each other. In some embodiments, the at least one intermediate representation includes at least one tree representation.

For example, the at least one intermediate representation can include at least one abstract syntax tree (AST). An AST is a tree representation of the abstract syntactic structure of the source code. Each node of the tree denotes a construct occurring in the text. Abstract syntax of data is the structure of data described as a data type, independent of any particular representation or encoding.

For example, generating the at least one intermediate representation can include generating at least one graph of the web traffic, and transforming the at least one graph into the at least one intermediate representation (e.g., at least one tree representation). The vertices or nodes of a graph can represent respective pairs of messages (e.g., request and response pair), and the edges of the graph can represent respective relationships between vertices (e.g., between the requests of each vertex). In some embodiments, the graph is a directed acyclic graph (DAG).

For example, to construct a graph based on a set of messages, the processing logic can store each message that is obtained from the web traffic as a vertex of the graph. The processing logic can then traverse each vertex (e.g., backwards traversal from last vertex to first vertex based on timestamp). For each vertex, the processing logic can identify a set of message components of the corresponding message (e.g., URI, message header and message body), and decompose each message component of the set of components into a set of component parts. A component part can be filled with data from a previous message (e.g., application version, authentication token, user ID in the system), user input (e.g., user credentials such as user name and password), etc. For example, a request can be filled with data from a previous response. As an illustration, an example message can have a URI that includes the URL https://api.platform.com/user/user123/payouts?start=2021-01-01&end=2021-01-15, a message header that includes:
Authorization: Token token=t123
X-App-Version: v1.0.0
and a message body that includes:
{
  "username": "user1",
  "password": "pass1",
}

A component part of the set of component parts of a particular message component can either be static (e.g., always the same) or dynamic. A dynamic message component can thus be a message component that includes at least one dynamic component part. Since static message components (e.g., static fields) remain unchanging over time, in order to automate code generation, the processing logic identifies which message components are dynamic message components (e.g., dynamic fields), and where they are coming from.

For each message component of a current message, the processing logic can run heuristics on at least one previous message to try and identify a relationship or connection between the current message and the at least one previous message. As an illustrative example, assume that the current message is the following current request message:
GET https://api.platform.com/user/user123/payouts?start=2021-01-01&end=2021-01-15 Authorization: Token token=t123
where "GET" refers to a GET method that is used to retrieve whatever information is identified by the URI (in this example, the URI is the URL "https://api.platform.com/user/user123/payouts? start=2021-01-01& end=2021-01-15"). This current request message may depend on a response message provided in response to a previous request message. For example, the previous request message may be:
POST https://auth.platform.com
{
  "username": "user1",
  "password": "pass1"
}
where "POST" refers to a "POST" method that is used to request that the target platform accept the entity enclosed in the request as a new subordinate of the resource identified by the URI (in this example, the URI is the URL "https://auth.platform.com"). The response message to this previous request message may be:
Response:
HTTP/1.1 200 OK
{
  "auth_token": "t123"
}
which provides the authentication token "t123" that is used to implement the GET method of the current request message.

If a relationship is found between vertices (e.g., a current request and a previous request), then an edge is created between the vertices. For example, a Request Builder declaration can be built for each relationship. An edge maintains dependency information between a pair of vertices. For example, an edge can maintain information about a response/request dependency. The process of finding relationships between messages and creating an edge for each relationship can be repeated for all message components for all messages. Thus, the processing logic can generate at least one dependency graph (e.g., DAG) of message (e.g., HTTP message) dependencies.

After generating the at least one graph, the processing logic can then transform the at least one graph into the at least one intermediate representation (e.g., at least one tree representation). Transforming the at least one graph into the at least one intermediate representation can include optimizing the at least one graph to obtain at least one optimized graph. For example, optimizing a graph can include simplifying the graph. In some embodiments, simplifying the graph includes replacing the graph with a transitive reduction of the graph. A transitive reduction of a first directed graph (e.g., DAG) is a second directed graph that has the same number of vertices, but with the least number of edges. That is, the first directed graph and the second directed graph have the same reachability relation. If the first directed graph does not include cycles (e.g., the first directed graph is a DAG), then the second graph can also be referred to as the minimum equivalent graph.

Transforming the at least one graph into the at least one intermediate representation can further include applying at least one heuristic to each branch of the at least one graph to identify one or more patterns that map to one or more extractions in the data extraction framework. The processing logic can then transform the at least one graph into the at least one intermediate representation based on the at least one heuristic. For example, multiple different heuristics can be applied to a particular graph, with each heuristic resulting in a different intermediate representation. Further details regarding obtaining the at least one intermediate representation will be described below with reference to FIGS. 5A-5D.

The processing logic can traverse each intermediate representation to obtain a respective data extractor code candidate. The data extractor code candidate can include a number of data extractor declarations that can be used to extract data from a target platform. For example, different heuristics applied to a particular graph can yield different data extractor code candidates for the particular graph. Accordingly, each data extractor code candidate can be considered to enable a variation of a data extractor.

For example, the information can include information identifying what constitutes a successful authentication attempt to the target platform. Additionally or alternative, the information can include information identifying which requests of the set of requests provide desired information for retrieval, and data required to retrieve the desired information.

At block 230A, the processing logic selects data extractor code from the set of data extractor code candidates. If the set of data extractor code candidates includes a single data extractor code candidate, then the single data extractor code candidate is trivially selected as the data extractor code. If there are multiple data extractor code candidates within the set of data extractor code candidates, a most optimal solution may not be immediately apparent. Thus, selecting the data extractor code from the set of data extractor code candidates can include performing code validation with respect to each data extractor code candidate. For example, a data extractor code candidate can be run based on the web traffic (e.g., using the web traffic recording). The data collected during execution of the data extractor code candidate can be output. The data extractor code candidate can be assigned one or more values (e.g., scores) for one or more respective metrics based on the output.

For example, a metric can be data completeness, and the value of the data completeness metric for a data extractor code candidate can be determined based on how many fields that can be extracted by the data extractor code candidate (e.g., a raw number, a percentage of total number of fields). Illustratively:

$$DCM_i = \frac{F_i}{F_{max}} = \frac{F_i}{\max(F_1 \ldots F_N)}$$

where $i \in [1, N]$ is an index value corresponding to an i-th data extractor candidate among N data extractor candidates, $DCM_i$ is the data complete metric for the i-th data extractor candidate, $F_i$ is the number of fields that can be extracted by the i-th data extractor candidate, and $F_{max}$ is the maximum number of fields that can be extracted among the N data extractor candidates. Thus, the data completeness metric can have a value that ranges from 0 to 1. Accordingly, the higher the data completeness value, the better the data extractor code candidate (ceteris paribus).

As another example, a metric can be complexity metric, and the value of the complexity metric for a data extractor code candidate can be based on a number of declarations for the data extractor code candidate (e.g., Request, Request-Flow, RequestBuilder). Illustratively:

$$CM_i = \frac{D_i}{D_{max}} = \frac{D_i}{\max(D_1 \ldots D_N)}$$

where $i \in [1, N]$ is the index value corresponding to the i-th data extractor candidate among N data extractor candidates, $CM_i$ is the data complete metric for the i-th data extractor candidate, $D_i$ is the number of declarations for the i-th data extractor candidate, and $D_{max}$ is the maximum number of declarations among the N data extractor candidates. Thus, the complexity metric can be have a value that ranges from 0 to 1. Accordingly, the lower the complexity value, the better the data extractor code candidate (ceteris paribus).

Conversely, the complexity metric can be replaced with a simplicity metric, in which a higher simplicity value corresponds to a better data extractor code candidate. Illustratively, the simplicity metric for the i-th data extractor candidate, $SM_i$ can be determined by:

$$SM_i = \frac{D_{max} - D_i}{D_{max}} = \frac{\max(D_1 \ldots D_N) - D_i}{\max(D_1 \ldots D_N)} = 1 - CM_i$$

where $SM_i$ ranges from 0 to 1. Accordingly, the higher the simplicity value, the better the data extractor code candidate (ceteris paribus).

The data extractor code candidates can be ranked in accordance with the values assigned to each data extractor code candidate, and a highest ranked data extractor code candidate can be selected based on the ranking. For example, if there is only one metric, then the ranking can select the data extractor code candidate with the most optimal value (e.g., highest data completeness value, lowest complexity value). However, if there are multiple metrics, then the ranking can be implemented based on a combination of the metric values.

For example, ranking the data extractor code candidates can include sorting the data extractor code candidates in accordance with a particular metric. Illustratively, if data extractor code candidates are sorted in accordance with the data completeness metric, then the top data extractor code candidate would have a highest data completeness value. However, if data extractor code candidates are sorted in accordance with the complexity metric, then the top data extractor code candidate would have a lowest complexity value.

As another example, ranking the data extractor code candidates can assigning a score to each data extractor code candidate based on each of the metrics. More specifically, a multivariable formula or equation (e.g., multivariable function) can be used in which the inputs are all of the metric values and the output is the score. Illustratively, the multivariable formula can include a linear combination of the metric values. Here, each metric can be assigned a weight reflecting importance, and the ranking can be a weighted linear combination of the metric values in which each metric value is multiplied by its respective weight. In some embodiments, a default ranking scheme can be provided. The default ranking scheme can be modifiable by a user to accommodate user preferences related to metric importance.

Illustratively, the score can have values ranging from 0 to 1. Assume that the metrics for an i-th data extractor candidate are the data completeness metric $DCM_i$ and the complexity metric $CM_i$ described above. The rank can be the linear combination $\alpha DCM_i + \beta CM_i$, where a is the weight value corresponding to $DCM_i$, $\beta$ is the weight value corresponding to $CM_i$ and $\alpha + \beta = 1$. It may be the case that $DCM_i$ is more important than $CM_i$. For example, a weight $\alpha$ can be 0.8, and the weight $\beta$ can be 0.2.

After selecting the data extractor code, the data extractor code can be implemented to extract data from the target platform. Further details regarding implementing the data extractor code will now be described below with reference to FIG. 2B.

Figure 2B:
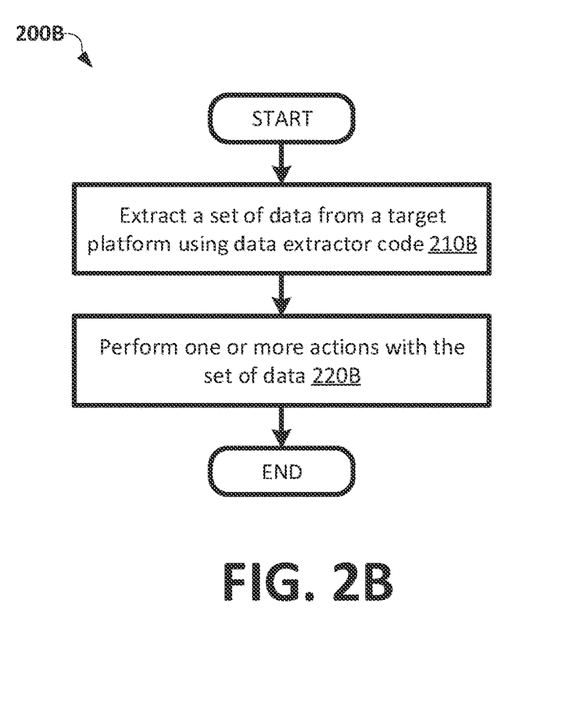
FIG. 2B depicts a flow diagram of an example method for implementing data extractor code, in accordance with some embodiments.

FIG. 2B depicts a flow diagram of an example method 200B for implementing data extractor code, in accordance with some embodiments. For example, the method 200B may be performed by data extractor 112 as shown in FIG. 1. Method 200B may be performed by one or more processing devices that may comprise hardware (e.g., circuitry, dedicated logic, programmable logic, microcode, etc.), executable code (such as is run on a general purpose computer system or a dedicated machine), or a combination of both. For example, the one or more processing devices can perform individual functions, routines, subroutines, or operations to implement the method 200B.

At block 210B, the processing logic extracts a set of data using the data extractor code. For example, the processing logic can request the set of data from the target platform in accordance with the data extractor code. The set of data can be extracted using data extractor code generated as described above with reference to FIGS. 1 and 2A.

At block 220B, the processing logic performs one or more actions with the set of data. For example, performing the one or more actions can include sharing the set of data with one or more applications. The set of data can be shared with user permission or consent.

Illustratively, the set of data can include a set of employment data. For example, the fields can include "company", "person name", "working since", etc. Declarations can be made to automatically go to a website maintaining employment data, and extract the set of employment data the website. The set of data can then be analyzed by one or more applications to obtain desired information (e.g., employee retention, trends of changing jobs). Additionally or alternatively, the set of employment data can be analyzed by one or more applications associated with one or more lending companies.as part of a determination of whether a particular user should be approved for a loan (e.g., automated loan underwriting).

As yet another example, the set of data can be used to perform automated price comparisons. The fields can include "brand", "price", "size", etc. for a particular type of item. Declarations can be made to automatically go to a website (e.g., e-commerce website), do a search query for the type of item and extract the desired data for each field. The set of data can then be analyzed by one or more applications to obtain the desired information price comparison information.

Figure 3:
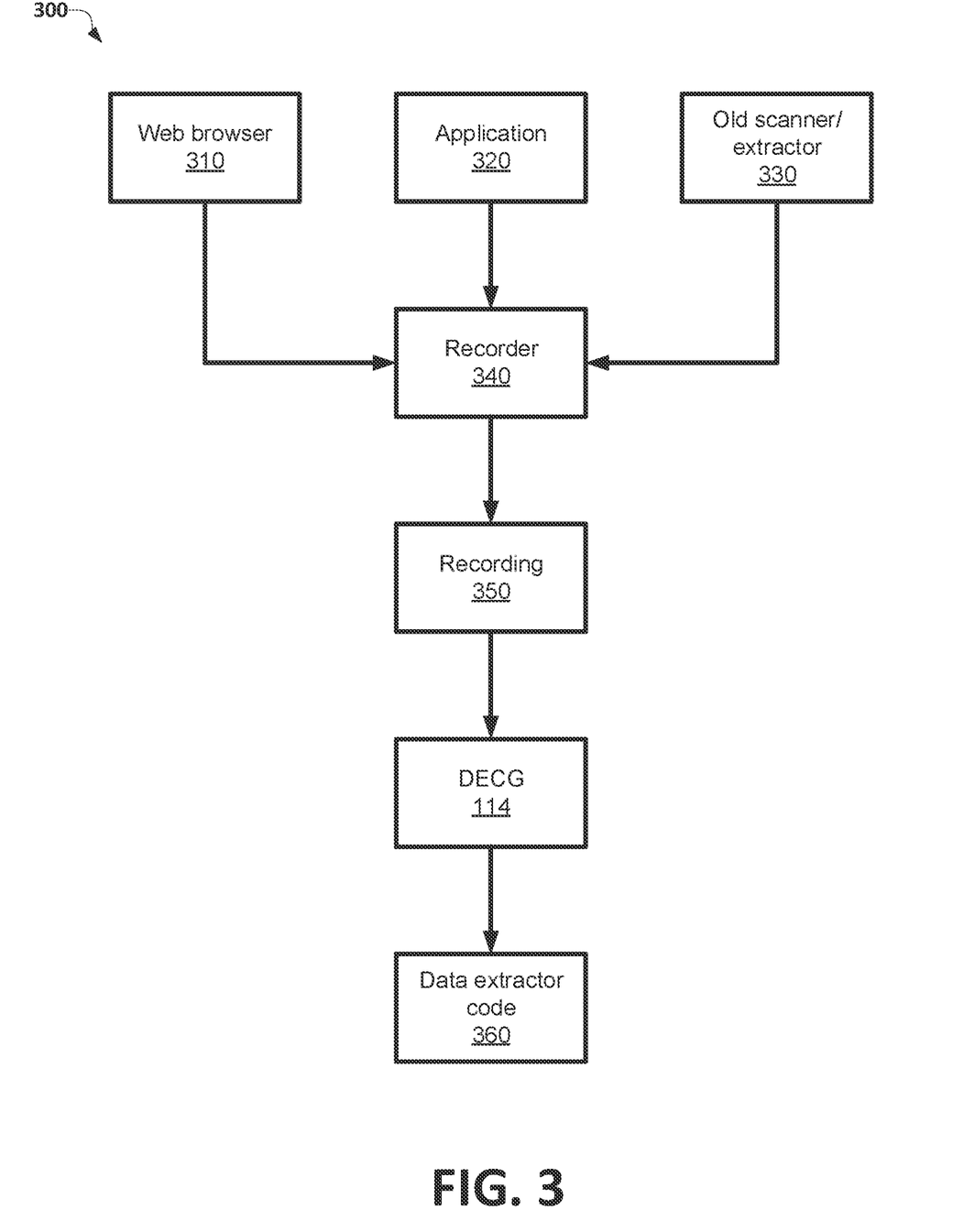
FIG. 3 depicts a block diagram of an example system for automatically generating data extractor code, in accordance with some embodiments.

FIG. 3 depicts a block diagram of an example system 300 for automatically generating data extractor code, in accordance with some embodiments. As shown, the system 300 includes a number of sources of web traffic including a web browser 310, an application 320 and an old scanner/extractor 330. A recorder 340 can receive the web traffic from each of the sources to generate a web traffic recording ("recording") 350. The recording 350 can be obtained by the DECG 114 to generate data extractor code 360 used to extract a set of data from a target platform, as described above with reference to FIGS. 1 and 2A-2B.

Figure 4:
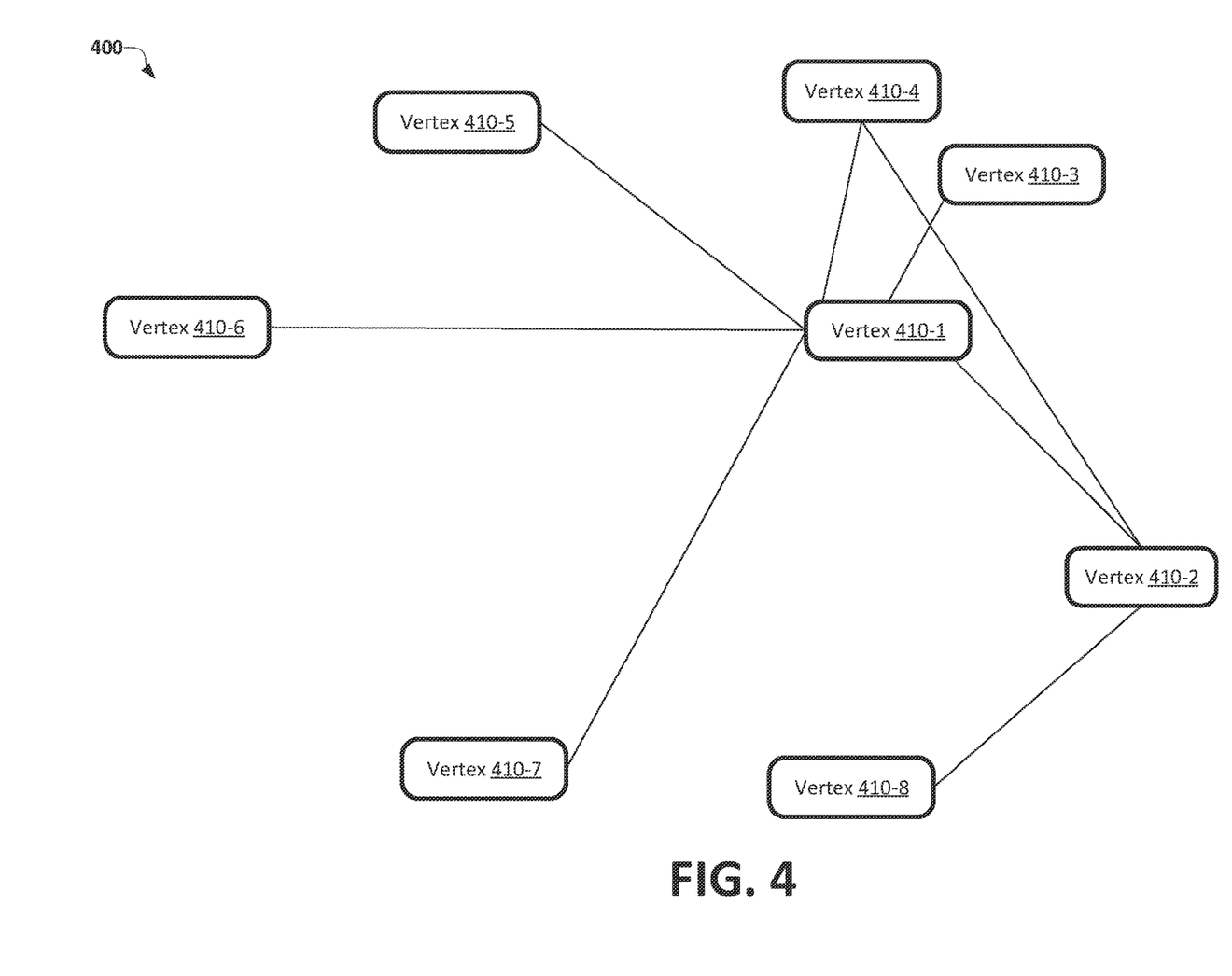
FIG. 4 depicts a diagram of an example web traffic analysis graph, in accordance with some embodiments.

FIG. 4 depicts a diagram of an example web traffic analysis graph ("graph") 400, in accordance with some embodiments. In some embodiments, the graph 400 is a directed acyclic graph (DAG). However, such an example should not be considered limiting. The graph 400 includes a number of vertices 410-1 through 410-8. Relationships between pairs of vertices are indicated by edges. Each of the vertices 410-1 through 410-8 represents a message (e.g., HTTP message). For example, each of the vertices 410-1 through 418-8 can represent a request message. The request message can include data such as method type (e.g., GET, POST), hostname for a URI of a target platform (e.g., api.platform.com), pathname for the URI of the target platform, etc.

Figure 5A:
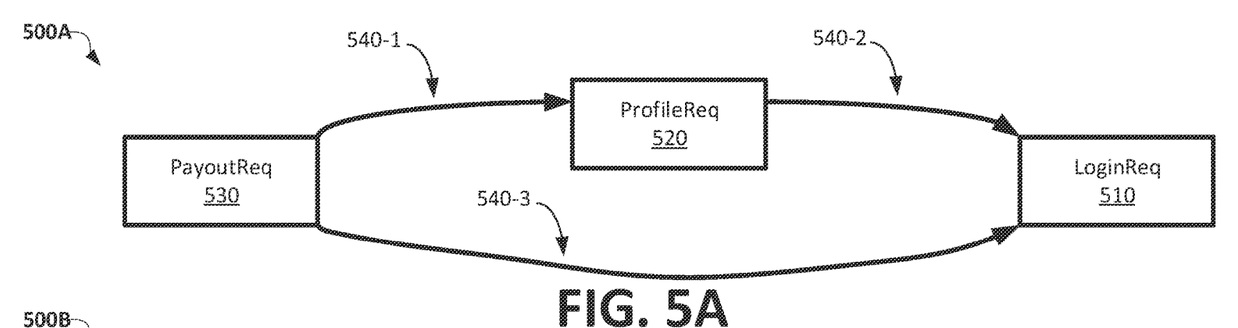
FIGS. 5A-5D depict diagrams of an example process for automatically generating data extractor code in accordance with some embodiments.

FIGS. 5A-5D depict diagrams of an example process for automatically generating data extractor code, in accordance with some embodiments. In FIG. 5A, a number of requests are stored by a data extractor code generator (DECG) (e.g., the DECG 114) as vertices in a graph 500A, including vertex 510 corresponding to a login request ("LoginReq"), vertex 520 corresponding to a profile request ("ProfileReq"), and vertex 530 corresponding to a payout information request ("PayoutReq"). Edge 540-1 is a connection directed from vertex 530 to vertex 520, edge 540-2 is a connection vertex 520 to vertex 510, and edge 540-3 is a connection vertex 530 to vertex 510. Since there are no cycles in this example, the graph is a directed acyclic graph (DAG). Illustratively, edges 540-2 and 540-3 can represent "headers. authorizationjson_body.auth_token" holding information about a request/response dependency:

```
{
  "headers" {
    "Authorization": {
      "json_body": "auth_token"
    }
  }
}
```

That is, PayoutReq depends on the authorization request response.headers.Authorizationjson_body["auth_token"].

Illustratively, edge 540-1 can represent "url.path.1: json_body.user_id".

Figure 5B:
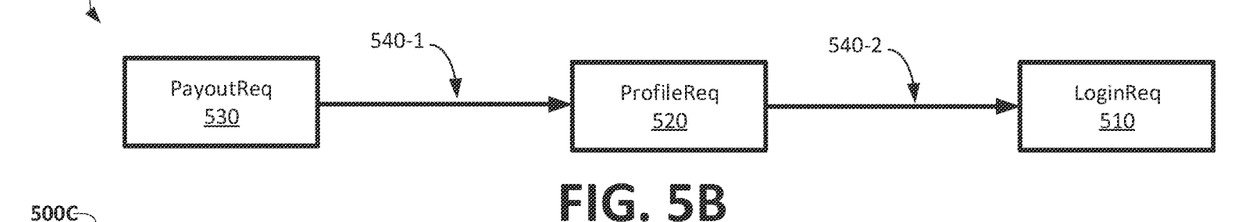

In FIG. 5B, the DECG simplifies the graph 500A by obtaining a transitive reduction of the graph 500B. More specifically, as shown, the edge 540-3 from the graph 500A is removed to obtain the graph 500B since this results in another graph with the same vertices 510-530, but with as few edges as possible while maintaining the same reachability in the original graph.

Figure 5C:
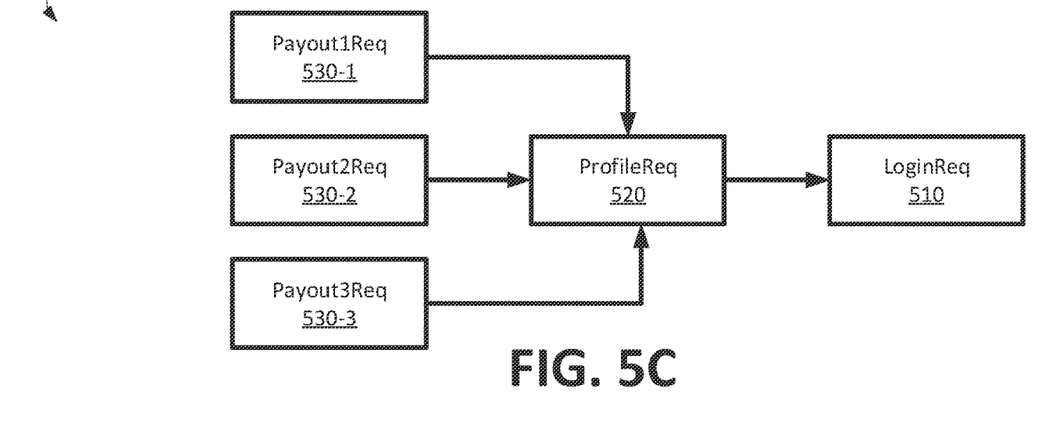

As described above, a message (e.g., request) can be a static request having static arguments or a dynamic request having dynamic arguments that can change. In FIG. 5C, graph 500C is shown including a number of vertices 530-1 through 530-3 each corresponding to a respective type of payout information request "Payout1Req", "Payout2Req" and "Payout3Req". More specifically, the payout information requests are dynamic requests that are identical when the dynamic data is stripped away from them. For example, the dynamic data can include payout date. The DECG attempts to detect that there is essentially a single payout information request with different dynamic arguments.

Figure 5D:
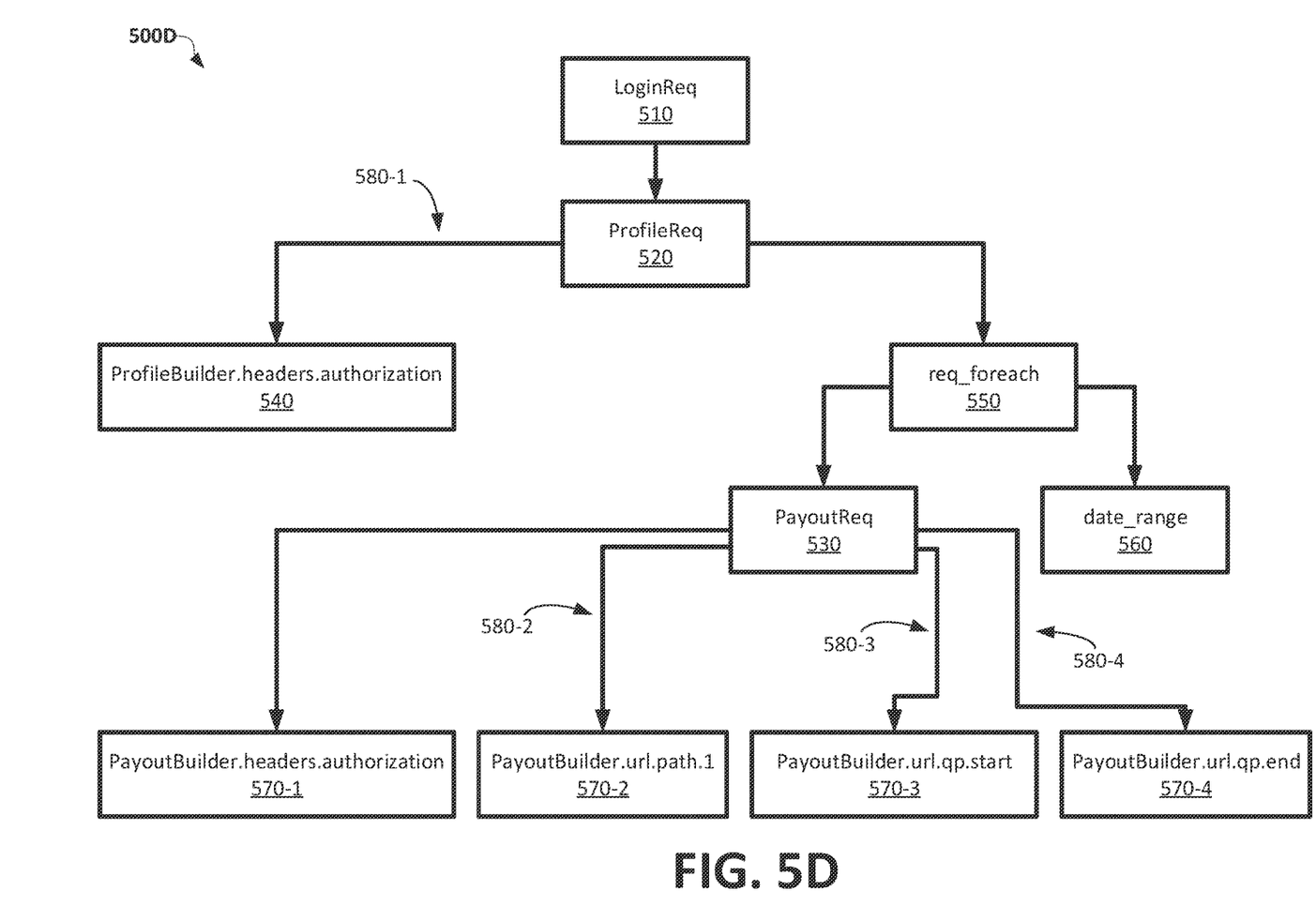

In FIG. 5D, the DECG transforms the graph 500C into an intermediate representation 500D. For example, each request and relation in the graph becomes a respective vertex in the intermediate representation 500D. As shown, the intermediate representation 500D is a tree representation. For example, the intermediate representation can be an abstract syntax tree (AST). As another example, the intermediate representation can be a parse tree. The intermediate representation includes the vertices 510-530. Additionally, the intermediate representation includes vertices 540-570. Each of the vertices 540-570 include information for generating source code, but have a more generic representation in memory. For example, vertex 540 corresponds to a profile builder declaration ("ProfileBuilder.headers.authorization"), vertex 550 corresponds to a request for each ("req_foreach"), vertex 560 corresponds to a date range ("date_range"), and vertices 570-1 through 570-4 each correspond to a respective one of the particular payout information builder declarations "PayoutBuilder.headers.authorization", "PayoutBuilder.url.path.1", "PayoutBuilder.url.qp.start" and "PayoutBuilder.url.qp.end".

The vertex 550 can be obtained during an intermediate representation optimization step. For example, the initial intermediate representation would include the three payout requests 530-1 through 530-3 shown in FIG. 5C. A loop detection method can be used to guess that the payout requests 530-1 through 530-3 are being executed in a loop. Each of these payout requests 530-1 through 530-3 can then be merged to create the vertex 550.

Each of the vertices 510-570 has a connection to at least one vertex using at least one edge. As shown, the edges include edges 580-1 through 580-4. Each of the edges 580-1 through 580-4 obtains at least some information from the previous response. The other edges (not labeled) may not use information from the previous response. Edge 580-1 connects vertex 520 to vertex 540. For example, edge 580-1 can represent "resp.json_body.auth_token". Edges 580-2 through 580-4 connect vertex 530 to vertices 570-2, 570-3 and 570-4, respectively. For example, edge 580-2 can represent "resp.json_body.user_id", edge 580-3 can represent "input.0" and edge 580-4 can represent "input.1".

The DECG can then traverse the intermediate representation to generate a data extractor code candidate based on the information contained in the vertices. For example, the data extractor code candidate can include a number of declarations. The following is an illustrative example of a data extractor code candidate written in the Python® programming language that can be generated from the intermediate representation shown in FIG. 5D:

```
class LoginReq(Request):
    method="POST"
    url="https://auth.platform.com"
    builder=(
        RequestBuilder( )
        .json_data(lambda _req, _s, _r: {"username":
            "user1", "password": "pass1"})
    )
class ProfileReq(Request):
    method="GET"
    url="https://api.platform.com/user"
    builder=(
    RequestBuilder( )
    .headers(lambda _req, _state, prev_resp: {
        "Authorization": prev_resp.json_data.get("auth_token")
    })
)
class PayoutReq(Request):
method="GET"
url=f"https://api.platform.com/user/user123/
    payouts?start={{qp1}}&end={{qp2}}"
builder=(
    RequestBuilder( )
    .url(lambda_req, state, _s: req.url.format
        (qp1=state.scan_range.start, qp2=state.s
        range.end))
)
scan=(
RequestFlow( )
.req(LoginReq)
.req(ProfileReq)
.req_foreach(PayoutReq)
)
```

Figure 6:
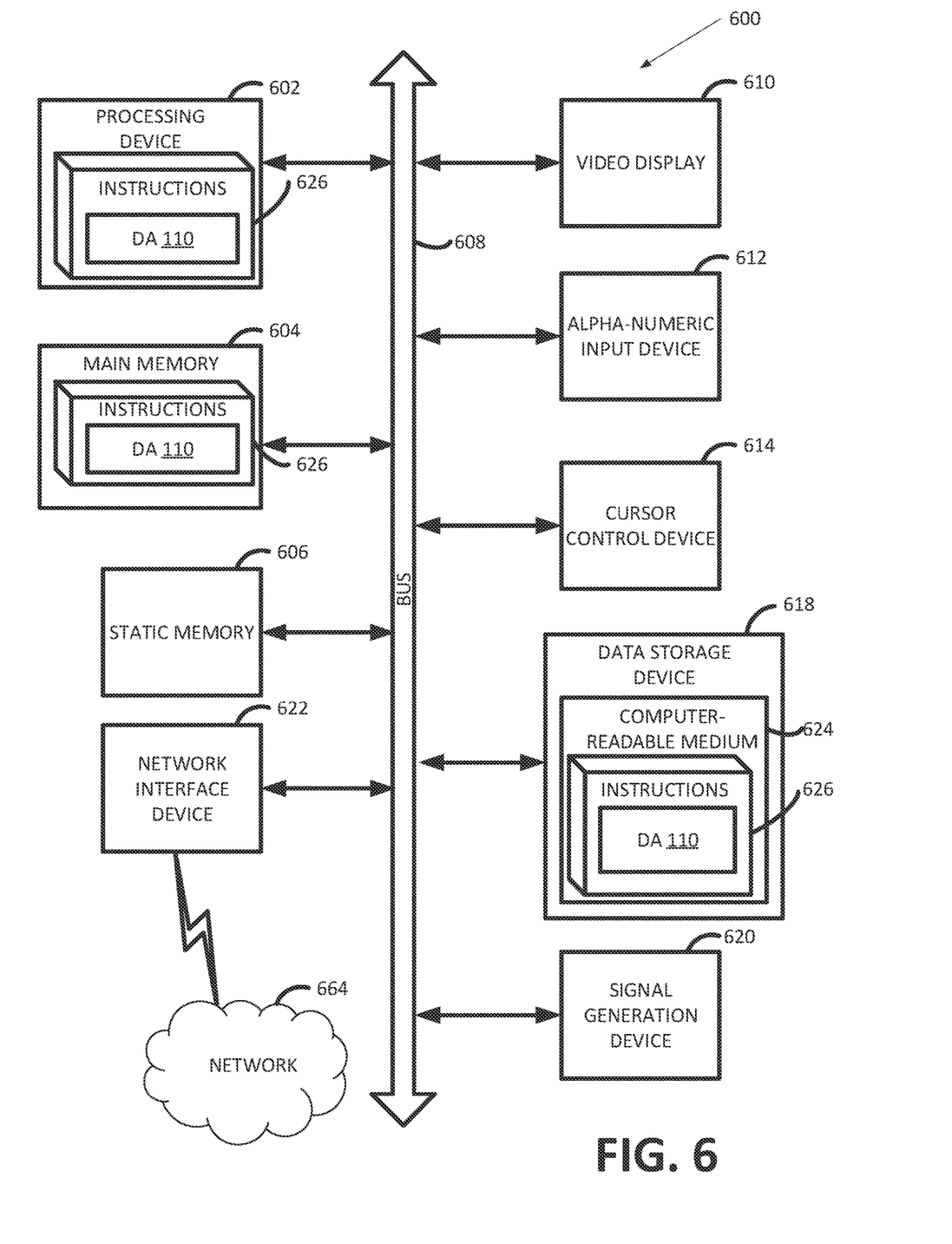
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620. Data storage device 616 may include a non-transitory computer-readable storage medium 624 on which may store instructions 626 encoding any one or more of the methods or functions described herein, including instructions for implementing the data extractor 112 and/or the DECG 114. Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner. In certain implementations, not all operations or sub-operations of the methods herein are required to be performed.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "obtaining," "analyzing," "selecting," "extracting," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
obtaining, by a processing device, a web traffic representation identifying at least one relationship between at least one pair of messages sent between a target platform and a client platform;
generating, by the processing device based on the web traffic representation, a set of data extractor code candidates, each data extractor code candidate of the set of data extractor code candidates comprising source code for extracting a set of data from the target platform;
assigning, by the processing device to each data extractor code candidate of the set of data extractor code candidates, a respective value derived from a set of metrics;

ranking, by the processing device, each data extractor code candidate of the set of data extractor code candidates in accordance with the respective value assigned to the data extractor code candidate;

selecting, by the processing device based on the ranking, data extractor code as a highest ranked data extractor code candidate from the set of data extractor code candidates; and causing, by the processing device, the set of data to be extracted from the target platform using the data extractor code.

2. The method of claim 1, further comprising:

obtaining, by the processing device, web traffic from one or more sources related to navigation to the target platform, the web traffic comprising a set of messages sent between the target platform and the client platform, the set of messages comprising the at least one pair of messages; and generating, by the processing device, the web traffic representation based on the web traffic;

wherein the set of messages comprises at least one of: a set of requests from the client platform to the target platform, or a set of responses from the target platform to the client platform.

3. The method of claim 2, wherein obtaining the web traffic comprises capturing the web traffic utilizing a web traffic recorder to generate a web traffic recording.

4. The method of claim 1, wherein the web traffic representation comprises an abstract syntax tree.

5. The method of claim 2, wherein generating the web traffic representation comprises:

generating a graph of the web traffic comprising a set of vertices and a set of edges, each vertex of the set of vertices representing a respective pair of messages and each edge of the set of edges representing a respective relationship between vertices; and transforming the graph into the web traffic representation.

6. The method of claim 1, wherein the set of metrics comprises at least one of: a data completeness metric associated with a number of fields that can be extracted by each data extractor code candidate, a complexity metric associated with a number of declarations for each data extractor code candidate, or a simplicity metric associated with the number of declarations for each data extractor code candidate.

7. The method of claim 1, further comprising:

causing, by the processing device, the set of data to be shared with an application.

8. A system comprising:

a memory; and a processing device, operatively coupled to the memory, to perform operations comprising:

obtaining a web traffic representation identifying at least one relationship between at least one pair of messages sent between a target platform and a client platform;

generating, based on the web traffic representation, a set of data extractor code candidates, each data extractor code candidate of the set of data extractor code candidates comprising source code for extracting a set of data from the target platform;

assigning, to each data extractor code candidate of the set of data extractor code candidates, a respective value derived from a set of metrics;

ranking each data extractor code candidate of the set of data extractor code candidates in accordance with the respective value assigned to the data extractor code candidate;

selecting, based on the ranking, data extractor code as a highest ranked data extractor code candidate from the set of data extractor code candidates; and causing the set of data to be extracted from the target platform using the data extractor code.

9. The system of claim 8, wherein:

the operations further comprise:

obtaining web traffic from one or more sources related to navigation to the target platform, the web traffic comprising a set of messages sent between the target platform and the client platform, the set of messages comprising the at least one pair of messages; and generating the web traffic representation based on the web traffic; and the set of messages comprises at least one of: a set of requests from the client platform to the target platform, or a set of responses from the target platform to the client platform.

10. The system of claim 9, wherein obtaining the web traffic comprises capturing the web traffic utilizing a web traffic recorder to generate a web traffic recording.

11. The system of claim 9, wherein generating the web traffic representation further comprises:

generating a graph of the web traffic comprising a set of vertices and a set of edges, each vertex of the set of vertices representing a respective pair of messages and each edge of the set of edges representing a respective relationship between vertices; and transforming the graph into the web traffic representation, wherein the web traffic representation comprises an abstract syntax tree.

12. The system of claim 8, wherein the set of metrics comprises at least one of: a data completeness metric associated with a number of fields that can be extracted by each data extractor code candidate, a complexity metric associated with a number of declarations for each data extractor code candidate, or a simplicity metric associated with the number of declarations for each data extractor code candidate.

13. The system of claim 8, wherein the operations further comprise:

causing the set of data to be shared with an application.

14. A non-transitory computer-readable storage medium comprising instructions that, when executed by a processing device, cause the processing device to perform operations comprising:

obtaining a web traffic representation identifying at least one relationship between at least one pair of messages sent between a target platform and a client platform;

generating, based on the web traffic representation, a set of data extractor code candidates, each data extractor code candidate of the set of data extractor code candidates comprising source code for extracting a set of data from the target platform;

assigning, to each data extractor code candidate of the set of data extractor code candidates, a respective value derived from a set of metrics;

ranking each data extractor code candidate of the set of data extractor code candidates in accordance with the respective value assigned to the data extractor code candidate;

selecting, based on the ranking, data extractor code as a highest ranked data extractor code candidate from the set of data extractor code candidates; and causing the set of data to be extracted from the target platform using the data extractor code.

15. The non-transitory computer-readable storage medium of claim 14, wherein:

the operations further comprise:

obtaining the web traffic from one or more sources related to navigation to the target platform, the web traffic comprising a set of messages sent between the target platform and the client platform, the set of messages comprising the at least one pair of messages; and generating the web traffic representation based on the web traffic; and the set of messages comprises at least one of: a set of requests from the client platform to the target platform, or a set of responses from the target platform to the client platform.

16. The non-transitory computer-readable storage medium of claim 15, wherein obtaining the web traffic comprises capturing the web traffic utilizing a web traffic recorder to generate a web traffic recording.

17. The non-transitory computer-readable storage medium of claim 15, wherein generating the web traffic representation further comprises:

generating a graph of the web traffic comprising a set of vertices and a set of edges, each vertex of the set of vertices representing a respective pair of messages and each edge of the set of edges representing a respective relationship between vertices; and transforming the graph into the web traffic representation, wherein the web traffic representation comprises an abstract syntax tree.

18. The non-transitory computer-readable storage medium of claim 14, wherein the operations further comprise:

causing the set of data to be shared with an application.

* * * * *